US007908916B2

(12) United States Patent
Jenniges et al.

(10) Patent No.: US 7,908,916 B2
(45) Date of Patent: Mar. 22, 2011

(54) FLAT BELT ROADWAY SIMULATOR WITH STEER AND/OR CAMBER ADJUSTMENT AND METHOD FOR ASCERTAINING ROLLING LOSS

(75) Inventors: Randal L. Jenniges, Bloomington, MN (US); Jerome A. Vonderharr, Shakopee, MN (US); David M. Hallman, Maple Grove, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 100 days.

(21) Appl. No.: 12/480,934

(22) Filed: Jun. 9, 2009

(65) Prior Publication Data

US 2009/0301183 A1 Dec. 10, 2009

Related U.S. Application Data

(60) Provisional application No. 61/059,985, filed on Jun. 9, 2008.

(51) Int. Cl.
*G01M 17/02* (2006.01)
(52) U.S. Cl. ........................................................ 73/146
(58) Field of Classification Search .................. None
See application file for complete search history.

(56) References Cited

U.S. PATENT DOCUMENTS

| | | | | |
|---|---|---|---|---|
| 3,520,180 A | * | 7/1970 | Ris et al. ........................... | 73/670 |
| 3,910,109 A | | 10/1975 | Pavlovsky et al. | |
| 4,238,954 A | * | 12/1980 | Langer ............................. | 73/146 |
| 4,344,324 A | * | 8/1982 | Langer ............................. | 73/146 |
| 4,458,527 A | * | 7/1984 | McFarland et al. .............. | 73/146 |
| 4,622,848 A | * | 11/1986 | Doi ................................... | 73/146 |
| 4,901,560 A | | 2/1990 | Hirano et al. | |
| 4,962,664 A | | 10/1990 | Hirano et al. | |
| 5,375,464 A | * | 12/1994 | Dadt ................................ | 73/146 |
| 5,481,907 A | | 1/1996 | Chasco et al. | |
| 6,575,024 B2 | * | 6/2003 | Sinnett ............................. | 73/146 |

(Continued)

FOREIGN PATENT DOCUMENTS

DE 2831978 A1 2/1980

(Continued)

OTHER PUBLICATIONS

Flat-Trac® Tire Test Systems, copyright 2005 MTS Systems Corporation.

(Continued)

*Primary Examiner* — Andre J Allen
(74) *Attorney, Agent, or Firm* — Steven M. Koehler; Westman, Champlin & Kelly, P.A.

(57) ABSTRACT

A testing machine includes a frame and a roadway assembly. The roadway assembly includes an endless belt and a carriage supporting the endless belt for rotation on the carriage and providing flat portion in the endless belt. The carriage is pivotally coupled to the frame to move relative to the frame about at least one axis. The carriage includes a bearing arranged to support an inner surface of the flat portion of the endless belt. A spindle carriage has a spindle arranged to support a tire and wheel assembly. The spindle carriage is movably mounted on the frame to move the spindle toward and away from the flat portion. A drive is operably coupled to the roadway assembly or the spindle. An actuator controls pivotal movement of the roadway assembly about said at least one axis. A method of ascertaining rolling loss of a tire mounted to such a machine is also provided.

23 Claims, 6 Drawing Sheets

U.S. PATENT DOCUMENTS

| | | | |
|---|---|---|---|
| 6,584,835 B2 | 7/2003 | Jenniges et al. | |
| 6,622,550 B1 | 9/2003 | Jenniges et al. | |
| 2001/0032499 A1* | 10/2001 | Jenniges et al. | 73/146 |
| 2005/0081616 A1* | 4/2005 | Suzuki et al. | 73/146 |
| 2009/0000371 A1* | 1/2009 | Hanada | 73/146 |
| 2009/0012763 A1 | 1/2009 | Langer et al. | |
| 2009/0120178 A1* | 5/2009 | Iwase | 73/146 |
| 2010/0037686 A1* | 2/2010 | Kitagawa et al. | 73/146 |

FOREIGN PATENT DOCUMENTS

| | | |
|---|---|---|
| GB | 2239099 A | 6/1991 |

OTHER PUBLICATIONS

Model 860 RoadWheel™ System For Durability Testing of Passenger Car and Light Truck Tires, copyright 2002 MTS Systems Corporation.

Official Search Report of the European Patent Office in counterpart foreign application No. PCT/US2009/046705 filed Jun. 9, 2009.

Written Opinion of the European Patent Office in counterpart foreign application No. PCT/US2009/046705 filed Jun. 9, 2009.

English translation of DE 2831978A1 provided by the European Patent Office.

* cited by examiner

FLAT BELT ROADWAY SIMULATOR WITH STEER AND/OR CAMBER ADJUSTMENT AND METHOD FOR ASCERTAINING ROLLING LOSS

CROSS-REFERENCE TO RELATED APPLICATION

This application claims the benefit of U.S. Provisional Application entitled "FLAT BELT ROADWAY SIMULATOR WITH STEER AND/OR CAMBER ADJUSTMENT" having Ser. No. 61/059,985 filed Jun. 9, 2008, the content of which is also incorporated herein by reference in its entirety.

BACKGROUND

The discussion below is merely provided for general background information and is not intended to be used as an aid in determining the scope of the claimed subject matter.

Various forms of testing machines have been advanced to test characteristics of rolling tire and/or wheel assemblies. One well known form includes a large rotateable drum that is driven by a suitable drive. A carriage assembly having a spindle to rotateably support the tire and wheel assembly is used to engage the tire against the drum. Commonly, the carriage assembly is configured to apply a selected load upon the tire against the drum as well as pivot the spindle to replicate different configurations of camber and steer of the tire and wheel assembly. Force sensors can be included in the spindle to measure selected forces. Drawbacks of this type of system include the complicated design of the spindle and adjustments needed, if even available, in ascertaining tire characteristics such as rolling loss in view of the crown of the drum.

Another form of known tire testing machines uses a roadway simulator that comprises an endless belt. Like the drum machine, a carriage assembly is configured to apply a selected load upon the tire against the endless belt roadway as well as pivot a spindle to replicate different configurations of camber and steer of the fire and wheel assembly. Force sensors can be included in the spindle to measure selected forces. Although such a machine provides a flat portion in the endless belt upon which the tire is rolled against, this machine also uses a complicated spindle to move and adjust the tire and wheel assembly.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

A testing machine includes a frame and a roadway assembly. The roadway assembly includes an endless belt and a carriage supporting the endless belt for rotation on the carriage and providing flat portion in the endless belt. The carriage is pivotally coupled to the frame to move relative to the frame about at least one axis. The carriage includes a bearing arranged to support an inner surface of the flat portion of the endless belt. A spindle carriage has a spindle arranged to support a tire and wheel assembly. The spindle carriage is movably mounted on the frame to move the spindle toward and away from the flat portion. A drive is operably coupled to the roadway assembly or the spindle. An actuator controls pivotal movement of the roadway assembly about said at least one axis. Commonly, the pivotal movement of the tire relative to the flat surface relates to changes in steer or camber. A method of operating such a system for testing a tire and/or wheel assembly such as ascertaining rolling loss of a tire mounted to such a machine is also provided.

In a further embodiment, the roadway assembly is configured to pivotally move relative to the frame about a second axis that is perpendicular to the first-mentioned axis. The machine further comprises a second actuator to control pivotal movement of the roadway assembly about the second axis. In this embodiment, both steer and camber of the tire can be adjusted.

In a further embodiment, the endless belt includes a second flat portion and the carriage includes a second bearing arranged to support an inner surface of the second flat portion of the endless belt. The machine further comprises a second spindle carriage having a second spindle arranged to support a second tire and wheel assembly. The second spindle carriage is movably mounted on the frame to move the second spindle toward and away from the second flat portion. A compact assembly able to test two tires is thereby provided.

Various types of bearing assemblies can be used to allow pivotal movement of the roadway relative to the frame. For instance, a U-joint, Cardin joint or spherical bearing can be used.

In a further embodiment, a device can be provide to provide an output indicative of torque in the roadway assembly or spindle (for example, inline torque cells, current flowing in a drive), power used by the drive, power generated by the roadway or spindle if a suitable power indicating component such as a generator is present, or forces on the spindle as measured by force sensors in the spindle or on the spindle carriage. Such device(s) are operably coupled to controller, which provides an output indicative of tire and/or wheel characteristics such as rolling loss of a tire mounted to the spindle.

DETAILED DESCRIPTION OF ILLUSTRATIVE EMBODIMENTS

Referring to the Figures, a testing machine 10 allows testing of vehicle tires 12, 14 using a flat belt roadway drive system which has camber adjustment and/or steer adjustment via a roadway assembly 22 movably mounted to a frame 20. The roadway assembly 22 includes an endless belt 24 that is supported by two rollers 28, 30. In one embodiment, one of the rollers, herein roller 28, is a drive roller while the other, herein roller 30, is in an idler roller. A drive motor 36 is coupled to the drive roller 28 by a drive mechanism 34 comprising suitable, belts, chains, gears, pumps, etc. Flat surfaces 24A and 24B of the roadway assembly belt 24 are oriented vertically such that a first tire and wheel assembly 40 engages one side of the roadway assembly belt 24, while a second tire and wheel assembly 42 engages the other side of the roadway assembly belt 24. Two tire and wheel assembly support spindle carriages 50, 52 respectively, are provided on the frame 20, one being on each side of the roadway assembly 22. Typically, each of the spindle carriages 50, 52 include linear guides and suitable actuators so that each of the tire and wheel assemblies 40, 42, mounted thereto on a rotatable spindle, can individually be brought into contact with the corresponding sides (flat portions 24A, 24B) of the roadway assembly 22. In this manner, radial loading on each of the tire and wheel assemblies 40, 42 due to simulating the weight of a corresponding vehicle is oriented horizontally on the frame 20. This allows the test machine 10 to conveniently test two tire and wheel assemblies 40, 42 at the same time. Although the vertical orientation of the roadway assembly 22 herein illustrated is convenient, it should not be considered limiting. Rather, it should be understood other orientations of the roadway assembly 22 and different configurations of frames 20 used to moveably support the roadway assembly 22 can be used with one or more aspects of the invention herein described, if desired. For example, the roadway assembly 22 can be movably mounted to the frame 20 such that one or two tire and wheel assemblies contact surfaces of the assembly 22 from above and/or below, or at any inclination relative to a base floor.

At this point should be noted that all actuators herein described can be hydraulic, pneumatic and/or electric as desired. As appreciated by those skilled in the art, the actuators can include single or double acting piston/cylinder assemblies, screw-driven rods, cams, bell cranks, levers, gears, etc.

The roadway assembly 22 is pivotally connected to the frame 20 so as to pivot about at least one or two axes that are perpendicular to an axis parallel to an axis of rotation of the roller 28 or 30. Any of the rotatable degrees of freedom may be restrained or controlled to provide the desired rotation degrees of freedom necessary for the testing application. Referring by way of example to tire and wheel assembly 40, the roadway assembly 22 can be pivotally connected to the frame 20 such that the roadway assembly 22 can pivot about a first axis 60 (perpendicular to the flat portion 24A or 24B) that simulates steering of a tire and wheel assembly 40 so as to introduce tire slip angle represented by double arrow 61. In addition, or in the alternative, the roadway assembly 22 can be pivotally connected to the frame 20 such that the roadway assembly 22 can pivot about a second axis 62 (typically perpendicular to the steer axis 60 or parallel to flat portion 24A or 24B) and parallel to the direction of belt travel (in the flat portions 24A, 24B) that simulates a camber change of the tire and wheel assembly 40 as represented by double arrow 63.

Figure 2:
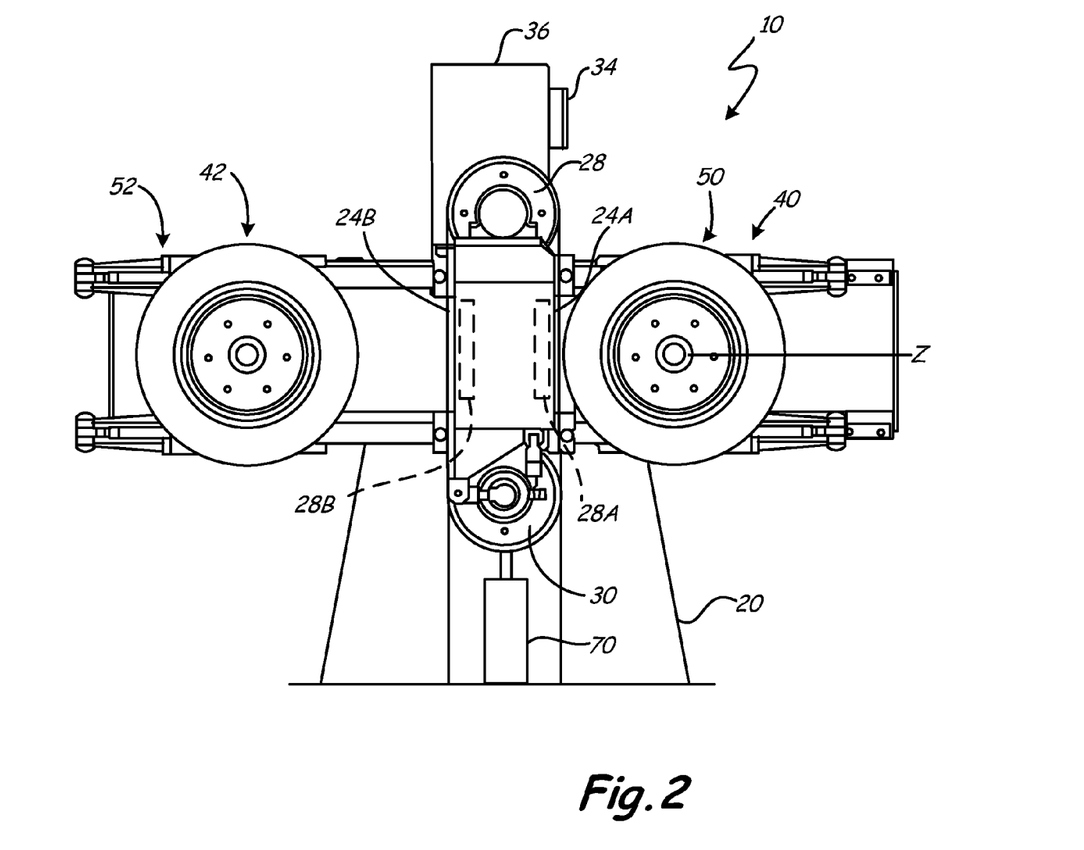
FIG. 2 is a front elevational view of the testing machine.

In the embodiments illustrated in the schematic figures of FIGS. 5A, 5B, 6A, and 6B a first actuator 70 is coupled to the frame 20 and the roadway assembly 22 to control pivoting of the roadway assembly 22 about the first or steer axis 60. (An alternative location for the steer actuator is illustrated in FIG. 2) In addition, or in the alternative, a second actuator 72 is coupled to the frame 20 and the roadway assembly 22 to control pivoting of the roadway assembly 22 about the second or camber axis 62. Pivot mechanisms or bearings that allow pivotal movement of the roadway assembly 22 relative to the frame 20 can be configured so the camber axis 62 can intersect with the steer axis 60 between the rollers 28, 30 and under or between tire support bearings 28A, 28B of the roadway assembly 22. Tire support bearings 28A, 28B are mounted to a carriage assembly 81 of the roadway assembly 22. The tire support bearings 28A, 28B provide reaction structure for each corresponding tire and wheel assembly 40, 42 by supporting an inner surface of the belt 24. The tire support bearings 28A, 28B can use a fluid (e.g. air or liquid) between the flat portions of the belt and the opposed surfaces of the tire support bearings 28A, 28B to minimize friction. Such bearings are well known in the art. Carriage assembly 81 also supports rollers 28 and 30. If desired, actuators can be used to support one or both of the rollers 28 or 30. By way of example, actuators 53 support the idler roller 30 on the carriage 81, which with actuation allow selective tensioning of the belt 24.

Depending on the type of drive mechanism 36 employed, the drive motor/pump components may or may not move with pivoting movement of the road assembly 22. For instance, if the drive mechanism 34 comprises belts and pulleys, a drive motor 36 may have to be structurally connected to move with the road assembly 22. However, if the drive mechanism 34 is hydraulic or pneumatic having hoses connecting the drive motor 36 to a drive pump (not shown), the drive pump can be stationary. In a further embodiment, the drive motor 36 can be mounted to the frame 20 where the drive shaft coupling the drive motor to the drive roller 28 (and/or torque cell or sensor 79 discussed below) has angular motion and plunge (axial sliding) flexibility.

Figure 5A:
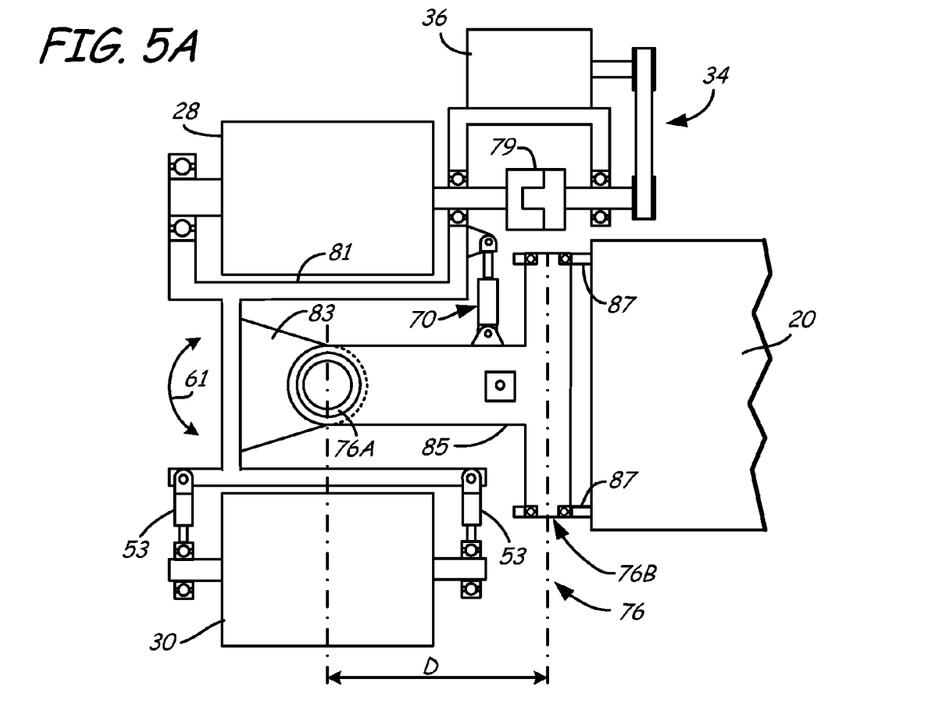
FIG. 5A is a schematic side elevational view of a portion of a first embodiment of the testing machine.
Figure 5B:
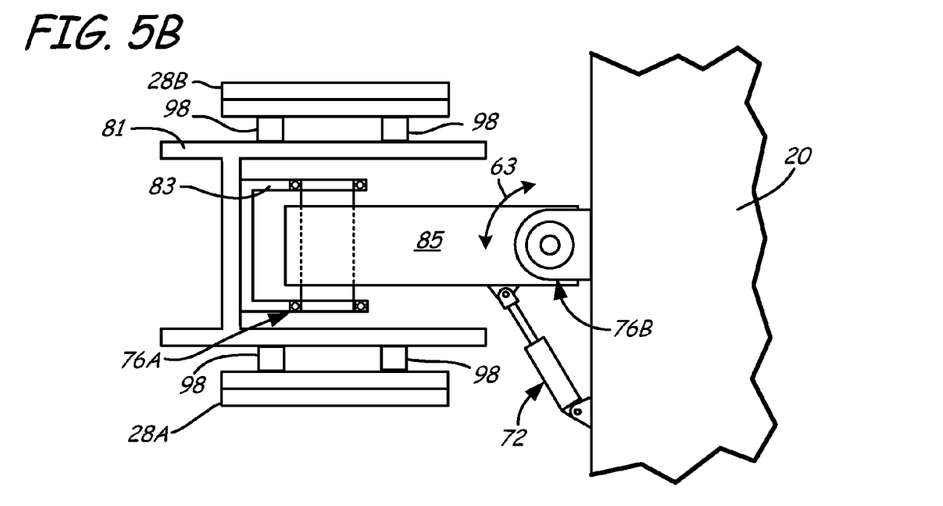
FIG. 5B is a schematic sectional view of the portion of the first embodiment of FIG. 5A.

In one embodiment illustrated in FIGS. 5A and 5B, rotation bearing assembly 76 comprises bearing portions 76A and 76B that that allow pivotal steer and camber movement, respectively. In the embodiment illustrated, one of the bearing portions 76A, 76B, herein bearing portion 76A, is within the roadway assembly 22 (i.e., between the rollers 28, 30 and under or between tire load support bearings 28A, 28B), thereby providing a steer axis that intersects with the belt 24 of the roadway assembly 22. By placing the steer rotation bearing portion 76A within the roadway assembly 20, two tires 12, 14 can be tested on the same roadway assembly 22 as illustrated. The bearing portion 76B for the second (camber) rotation axis 62 can also be disposed in the roadway assembly 22 so as to cause the axis 62 to intersect with the belt 24, or the bearing portion 76B can be arranged so that the axis 62 is slightly outboard of the roadway assembly 22 (i.e., does not intersect with the belt 24). Arranging the bearing portion 76B so that the camber rotation axis 62 is outboard of the roadway assembly 22 provides favorable pitch restraint on the roadway assembly 22. Herein, "pitch" is movement of the roadway assembly 22 about an axis that is perpendicular to both axes 60 and 62, in other words, an axis that is parallel to an axis of rotation of roller 28 or 30. This movement is generally undesired and spacing the bearing portions 76A and 76B as illustrated in FIGS. 5A and 5B inhibits such movement, and thereby, provides restraint.

In the embodiment illustrated in FIGS. 5A and 5B, rollers 28, 30 are supported on suitable bearings by the carriage assembly 81, which in turn, is supported by a first support 83 of bearing portion 76A. A second support 85 of bearing portion 76A is also a support of bearing portion 76B, while a second support 87 of bearing portion 76B is coupled to frame 20. Bearing portions 76A and 76B with support 83, 85 and 87 essentially form a U-joint or Cardin joint where a distance "D" between axes 60 and 62 can be zero or a non-zero value. Placement of the camber pivot axis 62 in the plane of the tire and wheel assembly reduces the amount of radial travel in the tire carriage.

In this embodiment, camber actuator 72 (FIG. 5B) is operably coupled between frame 20 and support 85, while steer actuator 70 (FIG. 5A) is operably coupled between support 85 and carriage 81. As appreciated by those skilled in the art, in an alternative configuration the steer actuator 70 could be operably coupled to the support 85 and the frame 20, while the camber actuator 72 is operably coupled to the support 85 and the carriage 81. In such a configuration, bearing portions 76A and 76B would be interchanged. It should also be noted the actuators 70 and 72 and components they are connected to can be lengthened or otherwise changed to increase or decrease associated lever arms as desired.

Figure 6A:
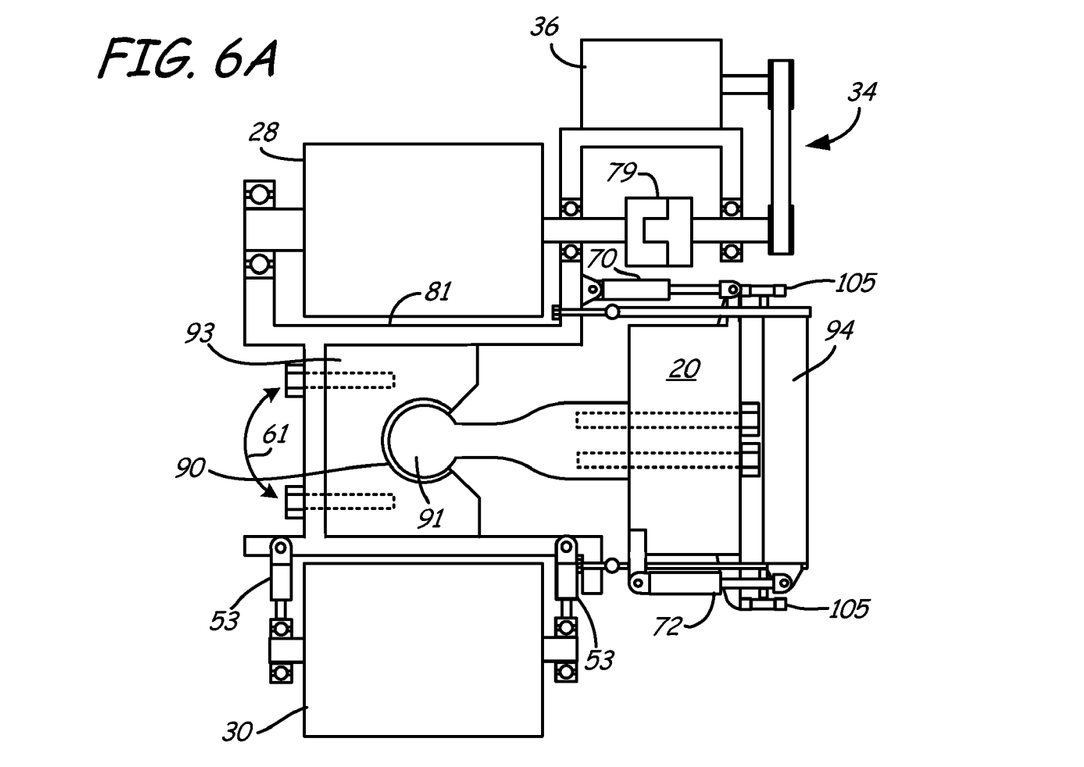
FIG. 6A is a schematic side elevational view of a portion of a first embodiment of the testing machine.
Figure 6B:
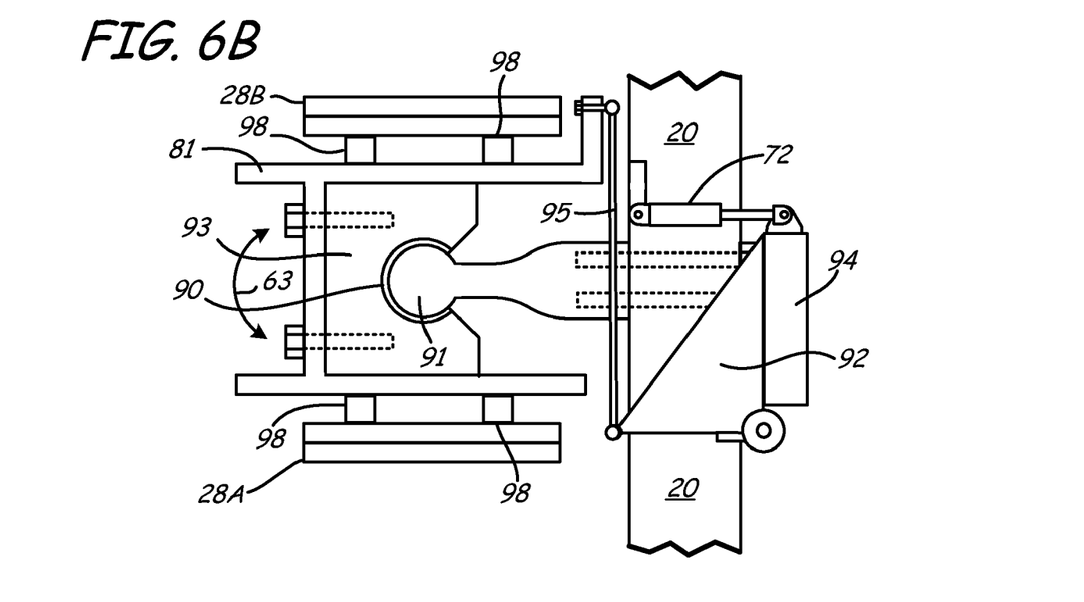
FIG. 6B is a schematic sectional view of the portion of the first embodiment of FIG. 6A.

In another embodiment illustrated schematically in FIGS. 6A and 6B, a spherical bearing 90 is used to support the roadway assembly 22 on the frame 20. It should be noted the same reference numbers have been used to identify components performing the same or similar functions as described above. The spherical bearing 90 can be positioned within the roadway assembly 22 (i.e., between the rollers 28, 30, for example, centered and under or between tire load support bearings 28A, 28B). In the embodiment illustrated, the spherical bearing 90 includes a ball 91 that is rigidly mounted to the frame 20, while a ball receiver or socket 93 is mounted to the carriage 81. Using such a bearing, places both the steer axis 60 and the camber axis 62 within the center of the roadway assembly 22 so that each intersects with the belt 24.

It should be noted, the spherical bearing 90 provides a third degree of freedom of pivotal motion, which is perpendicular to both the steer axis 60 and the camber axis 62, where movement about this axis was referred to as "pitch" above. Various link assemblies can be employed to provide pitch restraint. In one embodiment, pitch restraint is implemented with the camber actuator mechanism 72. Camber actuator mechanism includes an actuator joined to the frame and a bell crank assembly 92 pivotally joined to the frame 20 with bearings 105. The bell crank assembly 92 includes a torque tube 94 and link(s) 95 connected to the roadway assembly 22.

The testing machine 10 herein described provides a compact assembly for steering and cambering the roadway to provide slip angle and camber rotation. Pivotal movement of the roadway assembly 22 provides slip angle and camber angle rotation for one or two tire and wheel assemblies 40, 42 mounted on corresponding carriages. Pivotal movement of the roadway assembly 22 avoids the cost and complexity of replicating the motions of each tire carriage so as to provide the required steer and camber adjustments. The test machine 10 is particularly advantageous when pivotal movements of the roadway assembly 22 are approximately ±5 degrees, on in another embodiment, approximately ±2 degrees. Small rotation angles are useful on flat belt roadways for a variety of tests including but not limited to rolling resistance, residual alignment moment, residual lateral force, or cornering power tests.

It should be noted, use of the flat surfaces provided by the roadway assembly 22 does not require the camber and steer rotation to be at the surface of the roadway for steady state testing. Only the angular relation of the tire wheel plane relative to the road surface plane and direction of rotation is important. It is desirable to have the steer rotation axis to be near the center of the tire contact patch to prevent the steer rotation from causing tire fore-aft motion on the tire load support bearing 28A, 28B so that the size of the tire load support bearing 28A, 28B can be minimized.

The testing machine 10 allows use of a flat belt testing surface for each tire 12, 14 at small slip and camber angles. The roadway assembly 22 has lower rotation inertia than a comparable drum commonly used in the prior art. Lower inertia is favorable for measurement of roadway drive torque or power as a measure of tire rolling loss. Commonly, the roadway assembly 22 employs an air bearing as the tire load support bearings 28A, 28B which contributes low friction errors to the measurement. For ease of use, it is desirable to use carriage assemblies 50 and 52 having cantilevered spindles that make tire installation faster and simpler. If desired, force and moment load cells or sensors can be provided in the carriage assemblies 50 and 52.

Tire testing applications like a rolling resistance are customarily in the prior art done using large drums and with the tire and wheel assembly supported by tire carriages that only load the tire against a drum while tire steer (slip angle) and camber (inclination angle) are fixed at zero. Typically, when slip angle and/or camber angle are desired the carriage is configured to move the tire and wheel assembly with three degrees of motion. Accordingly, these carriages are typically relatively large and complex. In addition, single drum roadway simulators of the prior art use a drum that is larger than the tires under test as a means of reducing curvature effects on the tires. These large drums and the associated support structure and drive motors are not convenient to move in order to provide steer or camber rotation. Such movement would cause the tire contact to move off the crown of the drum and induce measurement errors so it is necessary to have centerline camber and steer with a curved surface. For drum type test systems it is thus move convenient to move the tire to achieve this.

Furthermore, it is difficult to place the steer and camber rotation axes so they intersect at the tire contact patch, which is necessary if testing on the rotatable drum of the prior art. However, testing on a flat surface eliminates this constraint particularly for steady state testing. Testing against a flat surface also eliminates measurement errors due to curvature of the large drum of the prior art, especially when slip angle and camber angle cause the tire to deflect out of plane.

Stated another way, use of flat surface portions 24A, 24B of the roadway assembly 20 can eliminate uncertainty due to curvature found in prior art drum type of tire test systems. There are a number of benefits of testing on a flat surface. When testing at zero slip angle, the inclination angle of the simulated roadway curvature from a drum causes the tire under test to deflect differently than on a flat surface. This can result in more tire hysteresis and energy consumption. The rolling resistance on a flat surface is believed to be about 10 to 23% lower than on a curved surface. The tire testing community thus uses a formula to convert curved surface data to flat surface data when tests are run at zero slip and camber angle. Although this formula is an accepted practice the SAE rolling resistance recommended practice cautions that the validity is not proven for universal use.

When a tire is steered or cambered, the tire deflects out of plane and generates lateral forces related to vehicle handling. However, this also causes the tire contact patch to shift on the roadway surface. This shift changes where the forces and moments are generated on the road surface. The effects of simulated roadway surface curvature on a tire that is deflected due to slip angle or inclination angle are complex. It is believed, there is no accepted flat surface approximation formula for converting curved surface data to corresponding flat surface data under such testing conditions.

Although the testing machine described above can be used for testing various aspects of a tire and/or wheel, another aspect herein described is that the system allows for rolling resistance and rolling loss measurement of vehicle tire(s) using a flat surface roadway simulation. Rolling resistance measurement can be done using a force or a torque method. Furthermore, the rolling loss measurement can be done at small camber (e.g. ±2 degrees) and/or steer (e.g. ±1 degree)

angles. Tire load in the vertical (z) direction (i.e. simulated vehicle weight along axis 60) is reacted using bearing(s) 28A, 28B. The combination of a flat belt roadway assembly 22 that can be moved in motions reflecting changes in steer and camber of a wheel and a torque sensor 79 to measure torque (herein being connected in series with drive mechanism 34 and driver roller 28). The torque sensor 79 provides an output indicative of torque applied to the drive roller 28. The measured torque can be used to provide and indication of rolling resistance. The force vector in the direction of roadway velocity is the tire rolling loss that is measured by the torque sensor 79. The bearing(s) 28A, 28B contribute to the feasibility of making this measurement via a torque measurement because the bearing(s) 28A, 28B support tire load with very low friction. The bearing(s) 28A, 28B also allow the roadway orientation to be in any direction.

Figure 1:
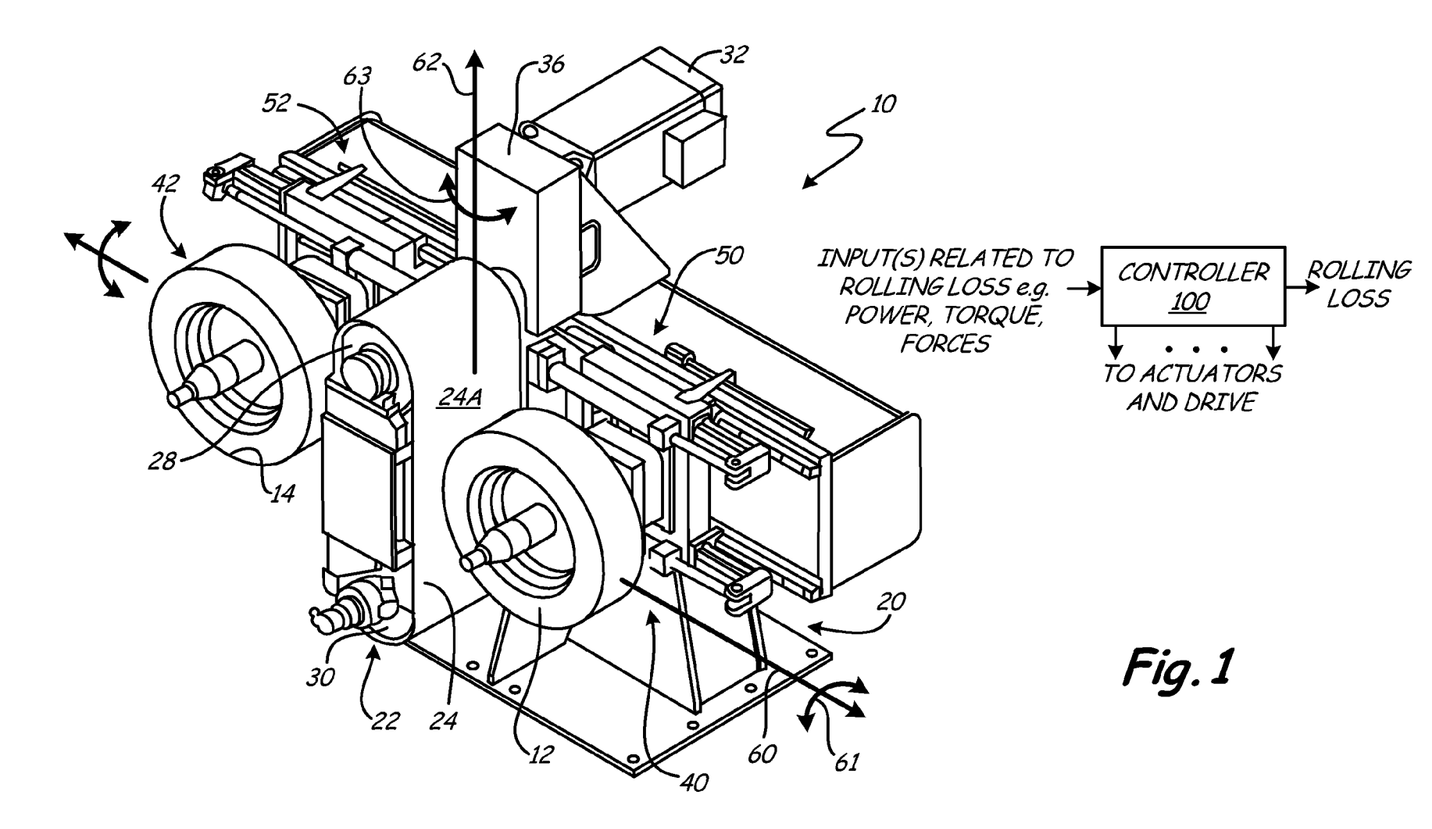
FIG. 1 is a perspective view of a flat belt roadway testing machine.

The torque method measures tire rolling loss by measuring the torque to drive the roadway assembly 22 with the tire loaded and then unloaded with the difference in power, for example, as measured directly, or as torque, or as forces, to name just a few, at the two load states representing or used as a basis for calculating a value related to tire rolling loss. Such calculations are known in the art. Referring back to FIG. 1, a controller 100 (analog and/or digital) receives as input(s) an indication of torque applied to the drive roller 28 and/or other forces for example measured at spindles of the carriages 50,52 and provides as outputs control signals to one or more of the afore-mentioned actuators and an output indicative of rolling loss of tire(s) operably mounted to spindle(s). In one aspect of the invention, a measurement of rolling loss is obtained using a measurement of torque such as a relatively simple rotating torque cell 79 on the roadway drive shaft (FIGS. 5A, 6A). This allows the rolling loss to be calculated based on the measurement of one sensor on the roadway assembly 22 rather than adding sensors (load cells) to each spindle of the carriages 50 and 52. In a further aspect, a measurement related to torque is also convenient for it automatically accounts for the orientation of the roadway assembly 22, being pivotable relative to the tire and wheel assembly. In an alternative embodiment, a measurement of torque can be obtained as sensed or known current flowing in the drive motor 36. In yet another embodiment, a difference in power used by the drive mechanism 34 can be used as an indication of rolling loss.

Figure 4:
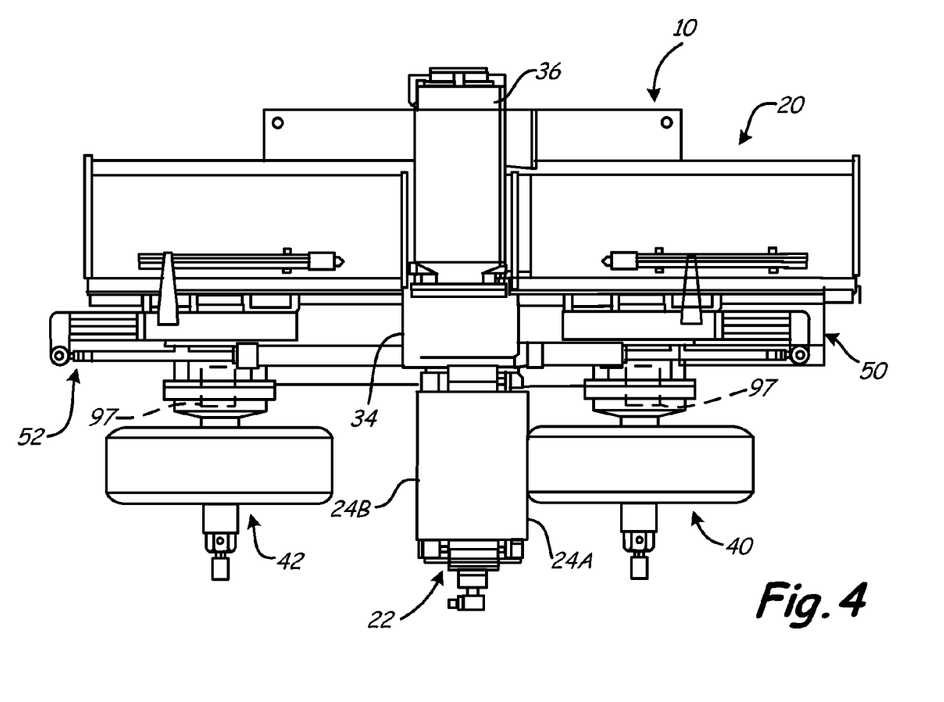
FIG. 4 is a top plan view of the testing machine.

However, it should be noted in an alternative method of measuring rolling loss, force measurements Fx and Fy (both of which are perpendicular to each other and perpendicular to the vertical direction z, or radial loading along the axis 60, which is the simulated vehicle weight) at the spindle of the carriage 50, 52. In FIG. 4, the force sensors are schematically illustrated at 97 as being part of the spindle. Nevertheless, it should be understood suitable force sensors can be operably coupled to various components of the carriage 50, 52 as appreciated by those skilled in the art. The addition of a sensor(s) to measure Fx and Fy forces on the spindle/carriage may be less favorable for it complicates the carriage design. Additionally, increasing the number of load cells or sensors on the spindle increases compliance and introduces camber and slip angle errors. Nevertheless, such measurements can be used to calculate rolling loss when using the pivotable roadway assembly 22 as provided herein.

Figure 3:
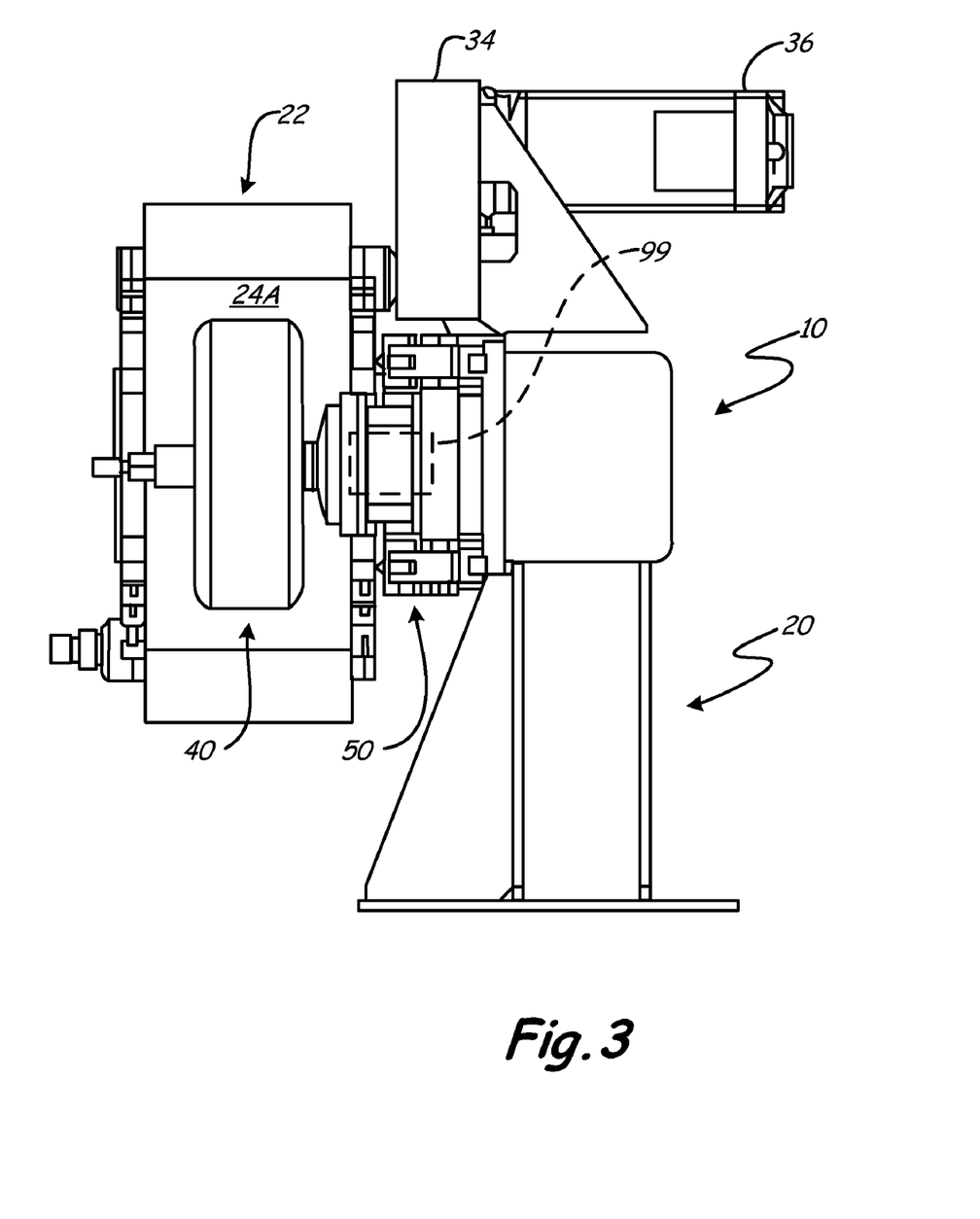
FIG. 3 is a side elevational view of the testing machine.

In yet another embodiment, the carriage 50, 52 can include a drive (hydraulic, pneumatic or electric), schematically indicated at 99 in FIG. 3 on carriage 50, operably coupled to the spindle to drive the spindle and thus the tire and wheel assembly 40, 42 on the roadway assembly 22 to move the belt 24. Again, with the tire loaded and then unloaded a difference in power used by drive 99 between these states can be used to provide an indication of rolling loss. If desired motor 36 can operate as a generator to provide an indication of power transferred to the roadway assembly 22, wherein the difference between power generated in the loaded and unloaded states, or the difference in power used by drive 99 and the power generated can be used to provide an indication of rolling loss. Likewise, component 99 can represent a generator, wherein the difference between power generated in the loaded and unloaded states at the spindle (the roadway 22 being driven by drive 34), or the difference in power used by drive 34 and the power generated by generator 99 can be used to provide an indication of rolling loss. Furthermore, as in the embodiment described above, torque measured directly via a torque cell on drive 99 or current flowing in drive 99, or spindle force sensors 97 as described above can also be used to provide an indication of rolling loss.

Measurement of simulated vertical forces of the vehicle (along axis 60) can be measured with one or more sensors or load cells 98 supporting bearings 28A, 28B (FIGS. 5B, 6B), incorporated in sensor 97 on the spindle of the carriage 50, 52, and/or as suitable sensors operably coupled to components of the carriage 50, 52.

The inertia of the roadway assembly 22 is much smaller than any drum system that meets the curvature recommendation of ISO and SAE. A conventional aluminum drum of the prior art has an estimated inertia of 300 kg m$^2$ based on Goodyear Luxembourg's specification. It is believed, a flat-belt system having features herein described and for the same application would have an estimated roadway inertia that is 10 to 20 times less than the best possible curved surface machine. In one exemplary embodiment it is estimated the roadway inertia for a system herein described will be between 15 and 30 kg m$^2$. This lower inertia is favorable for sensor such as torque cell sizing, drive motor sizing and acceleration capabilities of the system.

The flat surface test system 10 herein described is also a much smaller machine that a drum type of tire test system for the same application. Drum type systems commonly have a drum diameter of between 1.7 to 2 m. The flat belt roadway is typically less then 0.5 m between tire load surfaces resulting in a machine that is 1.2 to 1.5 m smaller, where overall material costs are thus less. There are also benefits to the end user by conserving laboratory space and reducing costs associated with building and operating the laboratory facility.

Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:
1. A testing machine comprising:
a frame;
a roadway assembly comprising:
  first roller;
a second roller;
an endless belt supported by and rolling on the first roller and the second roller; and
a carriage supporting the first roller and the second roller in spaced apart relation to cause a flat portion in the endless belt, the carriage being pivotally coupled to the frame to move relative to the frame about at least one axis that is perpendicular to an axis that is parallel to an axis of rotation of the first roller, the carriage including a bearing arranged to support an inner surface of the flat portion of the endless belt;
a spindle carriage having a spindle arranged to support a tire and wheel assembly, the spindle carriage movably mounted on the frame to move the spindle toward and away from the flat portion;
a drive operably coupled to the drive roller or the spindle; and
an actuator to control pivotal movement of the roadway assembly about said at least one axis.

2. The testing machine of claim 1 and wherein the endless belt includes a second flat portion and the carriage includes a second bearing arranged to support an inner surface of the second flat portion of the endless belt, and the machine further comprises a second spindle carriage having a second spindle arranged to support a second tire and wheel assembly, the second spindle carriage movably mounted on the frame to move the second spindle toward and away from the second flat portion.

3. The testing machine of claim 1 wherein said at least one axis comprises a steer axis perpendicular to the flat portion.

4. The testing machine of claim 1 wherein said at least one axis comprises a camber axis parallel to the flat portion.

5. The testing machine of claim 4 wherein the roadway assembly is configured to pivotally move relative to the frame about a steer axis that is perpendicular to the flat portion, and the machine further comprises a second actuator to control pivotal movement of the roadway assembly about the steer axis.

6. The testing machine of claim 1 and further comprising a bearing assembly pivotally connecting the carriage to the frame.

7. The testing machine of claim 6 wherein the roadway assembly is configured to pivotally move relative to the frame about a second axis that is perpendicular to the first-mentioned axis, and the machine further comprises a second actuator to control pivotal movement of the roadway assembly about the second axis.

8. The testing machine of claim 7 wherein the bearing comprises a spherical bearing.

9. The testing machine of claim 8 and further comprising a restraint configured to restrain motion of the roadway assembly about a third axis parallel to an axis of rotation of the first roller.

10. The testing machine of claim 7 wherein the bearing comprises a first bearing portion arranged to allow pivotal motion of the roadway assembly about the first axis and a second bearing portion arranged to allow pivotal motion of the roadway assembly about the second axis.

11. The testing machine of claim 1 and further comprising:
a device providing an output indicative of torque, power used, power generated, or forces; and
a controller operably coupled to the device and providing an output indicative of rolling loss of a tire mounted to the spindle.

12. A testing machine comprising:
a frame;
a roadway assembly comprising:
a first roller;
a second roller;
an endless belt supported by and rolling on the first roller and the second roller; and
a carriage supporting the first roller and the second roller in spaced apart relation to cause a first flat portion and a second flat portion in the endless belt, the carriage being pivotally coupled to the frame to move relative to the frame about at least one axis that is perpendicular to an axis that is parallel to an axis of rotation of the first roller, the carriage including a first bearing arranged to support an inner surface of the first flat portion of the endless belt and a second bearing arranged to support an inner surface of the second flat portion of the endless belt;
a first spindle carriage having a first spindle arranged to support a tire and wheel assembly, the first spindle carriage movably mounted on the frame to move the first spindle toward and away from the first flat portion;
a second spindle carriage having a second spindle arranged to support a tire and wheel assembly, the second spindle carriage movably mounted on the frame to move the second spindle toward and away from the second flat portion;
at least one drive operably coupled to the drive roller, the first spindle or the second spindle; and
an actuator to control pivotal movement of the roadway assembly about said at least one axis.

13. The testing machine of claim 12 and further comprising a bearing assembly pivotally connecting the carriage to the frame.

14. The testing machine of claim 13 wherein the roadway assembly is configured to pivotally move relative to the frame about a second axis that is perpendicular to the first-mentioned axis, and the machine further comprises a second actuator to control pivotal movement of the roadway assembly about the second axis.

15. The testing machine of claim 14 wherein the bearing comprises a spherical bearing.

16. The testing machine of claim 15 and further comprising a restraint configured to restrain motion of the roadway assembly about a third axis parallel to an axis of rotation of the first roller.

17. The testing machine of claim 13 wherein the bearing comprises a first bearing portion arranged to allow pivotal motion of the roadway assembly about the first axis and a second bearing portion arranged to allow pivotal motion of the roadway assembly about the second axis.

18. A method of tire testing comprising:
providing a frame; a roadway assembly comprising: an endless belt; and a carriage supporting the endless belt for rotation on the carriage and providing a flat portion in the endless belt, the carriage being pivotally coupled to the frame to move relative to the frame about at least one axis, the carriage including a bearing arranged to support an inner surface of the flat portion of the endless belt; a spindle carriage having a spindle supporting a tire and wheel assembly, the spindle carriage movably mounted on the frame to move the spindle toward and away from the flat portion; a drive operably coupled to the roadway assembly or the spindle; and an actuator to control pivotal movement of the roadway assembly about said at least one axis;
operating the actuator to pivot the roadway assembly relative to the frame and about the axis to obtain a desired position; and
operating the drive to cause rotation of the tire and wheel assembly.

19. The method of claim 18 and comprising calculating a value indicative of rolling loss for the tire.

20. The method of claim 18 wherein the roadway assembly is configured to pivotally move relative to the frame about a second axis that is perpendicular to the first-mentioned axis, and the machine further comprises a second actuator to control pivotal movement of the roadway assembly about the second axis, and the method further comprises the testing machine further comprises operating the second actuator to pivot the roadway assembly relative to the frame and about the second axis to obtain the desired position.

21. The method of claim 20 and comprising calculating a value indicative of rolling loss for the tire.

22. A testing machine comprising:
   a frame;
   a roadway assembly comprising:
   an endless belt; and
   a carriage supporting the endless belt for rotation on the carriage and providing a flat portion in the endless belt, the carriage being pivotally coupled to the frame to move relative to the frame about at least one axis, the carriage including a bearing arranged to support an inner surface of the flat portion of the endless belt;
   a spindle carriage having a spindle arranged to support a tire and wheel assembly, the spindle carriage movably mounted on the frame to move the spindle toward and away from the flat portion;
   a drive operably coupled to the roadway assembly or the spindle; and an actuator to control pivotal movement of the roadway assembly about said at least one axis.

23. The testing machine of claim 22 wherein the roadway assembly is configured to pivotally move relative to the frame about a second axis that is perpendicular to the first-mentioned axis, and the machine further comprises a second actuator to control pivotal movement of the roadway assembly about the second axis.

* * * * *

UNITED STATES PATENT AND TRADEMARK OFFICE
CERTIFICATE OF CORRECTION

| | | |
|---|---|---|
| PATENT NO. | : 7,908,916 B2 | Page 1 of 1 |
| APPLICATION NO. | : 12/480934 | |
| DATED | : March 22, 2011 | |
| INVENTOR(S) | : Jenniges et al. | |

It is certified that error appears in the above-identified patent and that said Letters Patent is hereby corrected as shown below:

Column 8,
Line 59, before "first roller;" insert --a--.

Column 9,
Line 8, delete "drive" and insert --first--.

Column 10,
Line 16, delete "drive" and insert --first--.

Signed and Sealed this
Fifth Day of July, 2011

David J. Kappos
*Director of the United States Patent and Trademark Office*